No. 664,906. Patented Jan. 1, 1901.
C. STEFFEN.
PROCESS OF WASHING OUT SUCRATE OF LIME.
(Application filed Apr. 6, 1898.)
(No Model.)
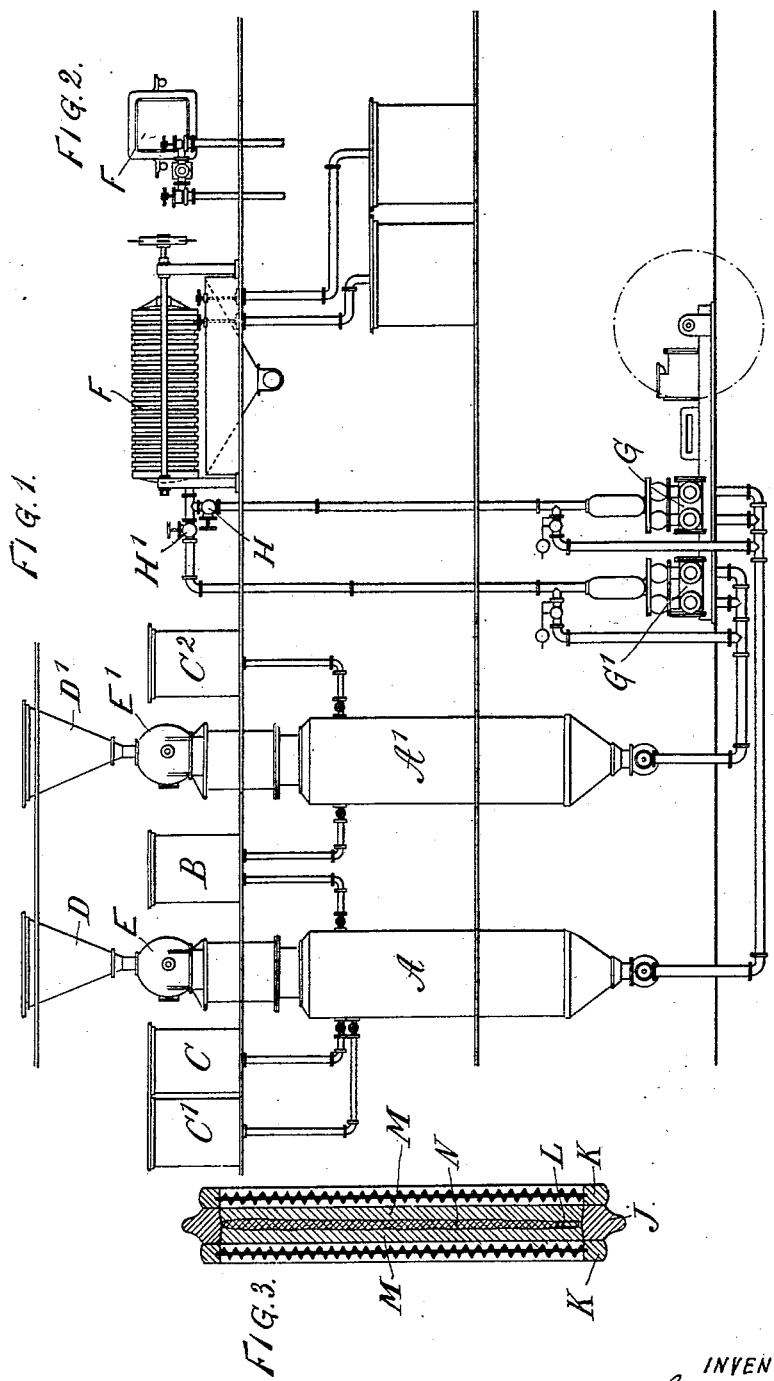
WITNESSES:
Eela L. Giles
[signature]
INVENTOR
Carl Steffen
BY
[signature]
ATTORNEYS.

UNITED STATES PATENT OFFICE.

CARL STEFFEN, OF VIENNA, AUSTRIA-HUNGARY.

PROCESS OF WASHING OUT SUCRATE OF LIME.

SPECIFICATION forming part of Letters Patent No. 664,906, dated January 1, 1901.

Application filed April 6, 1898. Serial No. 676,685. (No specimens.)

*To all whom it may concern:*

Be it known that I, CARL STEFFEN, engineer, a subject of the Emperor of Austria-Hungary, and a resident of No. 40 Heugasse, Vienna, in the Empire of Austria-Hungary, have invented a certain new and useful Improved Process for Washing Out Sucrate of Lime, of which the following is a full, clear, and exact description.

This invention relates to a process of obtaining pure sucrate or saccharate of lime as such is obtained according to known processes of precipitating sucrate of lime from impure aqueous liquors, syrups, or molasses by a peculiar new method of filtering or separating the sucrate of lime from the mother-liquor in filter-presses or similar apparatus, such filtering simultaneously effecting the washing of the sucrate of lime.

Figure 1 is an elevation of the apparatus for carrying out the process; Fig. 2, an end elevation of the filtering-press; Fig. 3, a cross-section through one chamber of the press on a larger scale, showing the formation of the cakes within the press-chamber in accordance with this process.

According to known processes for precipitating sucrate of lime such processes are usually carried out in such a manner that in order not to cause any unnecessary loss of sugar or obtain too thin and too much waste lye sugar liquors are used which possess the highest possible concentration, but still allow of a good separation of the precipitate from the mother-liquor. The sucrate of lime precipitated from such lyes is then filtered in filter-presses from the mother-lye and the obtained sugar-lime cakes are washed with water, clear lime-water, or a solution of sucrate of lime. The wash-water is either reëmployed for diluting a new liquor or passed off as waste lye. This method of washing out has great drawbacks, is unreliable, and faulty, since a great quantity of washing liquid is necessary for properly washing the sucrate. The sucrate cakes are, on the one hand, loosened at the periphery of the mud-frame or at less compact parts by the one-sided pressure of the washing liquid and, on the other hand, fine fissures and pores are formed in the mud mass which effects an unequal penetration of the mud cakes with washing liquid, so that such cakes are irregularly washed, much wash-water is used, and consequently not sufficiently pure sucrate obtained. If the filter-presses were put under too strong pressure, the washing would be rendered difficult.

The object of this invention is to overcome the disadvantages or drawbacks.

According to my process the sucrate remaining behind in the filter-press is not washed by clear washing liquids, but by means of such liquids in which sucrate of lime is suspended, which is adapted, on the one hand, to immediately fill up the fine interstices and pores formed during the washing and, on the other hand, to exert during and at the completion of the washing an increased pressure on the sucrate mass within the filter-frames. This washing liquid containing the suspended precipitate of sucrate of lime enters during the washing process in the filter-press not behind the cakes, but passes through the same mud-channel through which the original lye was driven into the filter-press.

The operation is effected in such a manner that the original lye in which the precipitated sucrate of lime is present is first passed or fed to the filter-press through the mud channel or passage in the usual manner until the filter-frames are partly filled with a suitable quantity, (about eighty per cent.) The feed of original lye is then interrupted—*i. e.*, stopped by valves. Now the washing liquid containing insoluble suspended precipitate of sucrate of lime is pressed into the filter-press under sufficient pressure until the free spaces of the chambers of the press are filled up with the precipitate.

The following method may be adopted for producing the washing liquid for such sucrates of lime: The washing liquid is produced from the sugar substance, (syrup or molasses,) from which also the concentrated original lyes are formed. For this purpose the syrup or molasses is diluted with so much pure water that in one hundred parts only a small quantity of saccharate or non-saccharate substance is contained. The proportions are one and one-half per cent. sugar and about seven-tenths to one per cent. non-saccharine substance. Sucrate of lime is then precipitated from this thin liquor in the usual manner by introducing lime and an insoluble sucrate is formed in the washing liquid. Since the quantity of non-saccharine substance in the washing liquid is very small, the same is of no moment for the washing process of the sucrate which is present in the filter-press from the concentrated original lye. The vessels or receptacles A and A' serve for precipitating the sucrate of lime from aqueous sugar liquors by means of lime in the known manner. For this purpose the vessel A is fed with molasses or impure sugar liquor from the vessel B, and the molasses is diluted with water or washing liquid from the vessels C and C', respectively, to a concentration of six to ten per cent. sugar, advantageous for the precipitation. After this liquid has been produced in the vessel A lime-powder is fed to this vessel from the hopper D or the disintegrating apparatus E connected therewith, and the precipitation of sucrate of lime is thereby effected in the vessel A in the known manner. In the vessel A' the same molasses or impure sugar liquor fed from the vessel B is likewise diluted with water from the vessel $C^2$, communicating with A' to a considerably lower concentration than the liquid in the vessel A. The dilution is preferably such that in one hundred parts liquid the contents of non-saccharine matter are below three per cent. or preferably amount to only about one per cent. This diluted liquid in the vessel A' is likewise fed with lime from the hopper D' and the disintegrating apparatus E', respectively, and in this manner a precipitation of sucrate of lime is effected in the vessel A'.

After the liquids containing precipitated sucrate of lime have been produced in the vessels A A' in the above-described manner the filtration of same in a filter-press F is carried out as follows: By means of a pump G, which is connected to the filter-press by a pipe, the valve H of which is open, the contents of the vessel A are pressed or forced into the filter-press, which is filled up to about four-fifths of its capacity with precipitated sucrate of lime. This partial filling of the press can most conveniently be ascertained by the pressure indicated on a manometer of the pump G. It is recommended to work with the pump G up to a pressure of about three atmospheres, since in this case the press is filled up to about four-fifths of its capacity. Now the valve H is closed and by means of a pump G' the diluted liquid is pressed or forced from the vessel A' into the filter-press, the valve H' being open. The diluted precipitating liquid is pressed from the vessel A' into the filter-press F until the chambers of the same are completely filled with sucrate of lime. This takes place when the manometer of the pump G' indicates a pressure of about six to eight atmospheres. At this moment the process is finished. The material remaining behind in the filter-press is a very pure sucrate of lime, which need not be subjected to a further washing process.

Fig. 3 is a cross-section through a filter-frame J, arranged between the filter-plates K K'. L indicates the opening or channel through which the concentrated liquid is first pressed from the vessel A by the pump G. M shows in cross-section the material which during the filtration is deposited on the filter-cloths on the right and left. N indicates the sucrate deposited within the frame J between the layers of material M M and originating from the diluted liquid of the vessel A', which has been pressed by the pump G' through the same opening L into the filter-press F.

According to this process the layers M and N are formed from the same material—viz., the sucrate of lime—while the mother-lye of the diluted liquid from the vessel A' contains less quantities of non-saccharine matter, and consequently can displace the lye of the sucrate from the more concentrated liquid taken from the vessel A, which lye is richer in non-saccharine matter and forms the layers M of the filter-press chambers.

This process may not only be carried out in filter-presses, but also in suction apparatus, centrifugal machines, and similar apparatus.

Having now particularly described and ascertained the nature of the said invention, I declare that what I claim, and wish to secure by Letters Patent, is—

The process of washing out sucrate of lime in filter-presses consisting in only partly filling the filter-press with the substance to be washed and subsequently supplying the space, which is not occupied by such substance, with less concentrated washing liquid consisting of a mixture of water and insoluble precipitate of lime, for the purpose of filling up the porous places formed in the impure substance during the washing process and of enabling a uniform penetration of the washing liquid and formation of solid cakes by simultaneously subjecting the substance to be washed to a strong pressure, substantially as and for the purpose set forth.

In witness whereof I have hereunto signed my name, this 21st day of March, 1898, in the presence of two subscribing witnesses.

CARL STEFFEN.

Witnesses:
HENRY C. CARPENTER,
CHAS. E. CARPENTER.